US011929005B2

(12) United States Patent
Chen et al.

(10) Patent No.: US 11,929,005 B2
(45) Date of Patent: Mar. 12, 2024

(54) DRIVE COMPENSATION METHOD AND SYSTEM OF A DISPLAY PANEL, AND DISPLAY DEVICE

(71) Applicant: Xiamen Tianma Display Technology Co., Ltd., Xiamen (CN)

(72) Inventors: Qiang Chen, Xiamen (CN); Chen Zhong, Xiamen (CN); Meng Lai, Xiamen (CN); Wang Yu, Xiamen (CN); Jingxiong Zhou, Xiamen (CN); Zhiqiang Xia, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/091,796

(22) Filed: Dec. 30, 2022

(65) Prior Publication Data

US 2023/0145976 A1 May 11, 2023

(30) Foreign Application Priority Data

Oct. 8, 2022 (CN) ......................... 202211223743.6

(51) Int. Cl.
*G09G 3/20* (2006.01)

(52) U.S. Cl.
CPC ... *G09G 3/2003* (2013.01); *G09G 2320/0233* (2013.01); *G09G 2320/0242* (2013.01)

(58) Field of Classification Search
CPC .. G09G 5/00; G09G 5/18; G09G 3/18; G09G 3/20; G09G 3/32; G09G 3/36; G09G 3/3275; G09G 3/3266; G09G 3/3233; G09G 3/3258; G09G 3/3225; G09G 3/2003; G09G 2320/0233; G09G 2320/0242; G02F 1/133; G02F 1/1362; G02F 1/1345;

(Continued)

(56) References Cited

U.S. PATENT DOCUMENTS

| | | | | |
|---|---|---|---|---|
| 2015/0185575 | A1* | 7/2015 | Xu | G09G 3/006 349/33 |
| 2018/0218665 | A1* | 8/2018 | Nitobe | G06F 3/0446 |
| 2021/0225246 | A1* | 7/2021 | Han | G09G 3/20 |

(Continued)

FOREIGN PATENT DOCUMENTS

| | | | |
|---|---|---|---|
| CN | 109243374 | A | 1/2019 |
| CN | 113674663 | A | 11/2021 |

*Primary Examiner* — Chanh D Nguyen
*Assistant Examiner* — Nguyen H Truong
(74) *Attorney, Agent, or Firm* — KDW Firm PLLC

(57) ABSTRACT

Provided are a drive compensation method and system of a display panel and a display device. The drive compensation method includes: determining at least one of the impedance and capacitive reactance variation curve of a first signal line in a column direction and determining the charge rate variation curve of first pixel units in a row direction; determining the compensation coefficients for a respective pixel unit in the column direction and/or the row direction according to the impedance and capacitive reactance variation curve of the first signal line in the column direction and/or the charge rate variation curve of first pixel units in the row direction; and compensating the compensation coefficients for the respective pixel unit in the column direction and/or the row direction to the drive signal of the respective pixel unit to drive the respective pixel unit.

13 Claims, 7 Drawing Sheets

(58) Field of Classification Search
CPC .... G02F 1/1333; G02F 1/1343; G02F 1/1368; G02F 1/1335
See application file for complete search history.

(56) References Cited

U.S. PATENT DOCUMENTS

| | | | | |
|---|---|---|---|---|
| 2022/0114982 | A1* | 4/2022 | Tsuchi | G09G 3/2096 |
| 2023/0138235 | A1* | 5/2023 | Xu | G09G 3/20<br>345/694 |

* cited by examiner

DRIVE COMPENSATION METHOD AND SYSTEM OF A DISPLAY PANEL, AND DISPLAY DEVICE

CROSS-REFERENCE TO RELATED APPLICATION(S)

This application claims priority to Chinese Patent Application No. 202211223743.6 filed Oct. 8, 2022, the disclosure of which is incorporated herein by reference in its entirety.

TECHNICAL FIELD

Embodiments of the present disclosure relate to the field of display technology and, in particular, to a drive compensation method and system of a display panel and a display device.

BACKGROUND

An organic light-emitting display panel has the advantages of self-light emitting, a low drive voltage, high light-emitting efficiency, a fast response speed, lightness and thinness, and high contrast, and the organic light-emitting display panel is more and more widely used in other display panels having display functions such as mobile phones, computers, televisions, in-vehicle display panels, or wearable devices.

A pixel unit in an organic light-emitting display panel includes a pixel driving circuit. A drive transistor in the pixel driving circuit may generate a drive current. A light-emitting element emits light in response to the drive current. A signal line extending laterally or longitudinally is disposed on the display panel to provide a drive signal to a pixel drive current so that the drive transistor in the pixel driving circuit generates the drive current.

However, since the signal line extending laterally or longitudinally has certain impedance and capacitive reactance in actual conditions, the drive signal transmitted thereon may be attenuated to a certain extent. As a result, there is a difference between pixel driving circuits, so that there is a certain problem of uneven display in the lateral or longitudinal direction of the display panel.

SUMMARY

The present disclosure provides a drive compensation method and system of a display panel and a display device to alleviate the display unevenness problem of the display panel caused by the impedance and capacitive reactance of a signal line.

In a first aspect, an embodiment of the present disclosure provides a drive compensation method of a display panel. The display panel includes multiple pixel units sequentially arranged in a row direction and a column direction respectively, and the display panel also includes multiple signal lines extending in the row direction and the column direction respectively. The pixel units include first pixel units sequentially arranged in the row direction. The signal lines include first signal lines extending in the column direction.

The drive compensation method includes the steps below.

The impedance and capacitive reactance variation curve of a first signal line in the column direction is determined. Moreover/Alternatively, the charge rate variation curve of first pixel units in the row direction is determined.

The compensation coefficient for a respective pixel unit in the column direction and/or the row direction are determined according to the impedance and capacitive reactance variation curve of the first signal line in the column direction and/or the charge rate variation curve of first pixel units in the row direction.

The compensation coefficients for the respective pixel unit in the column direction and/or the row direction are compensated to the drive signal of the respective pixel unit to drive the respective pixel unit.

In a second aspect, an embodiment of the present disclosure provides a drive compensation system of a display panel. The display panel includes multiple pixel units sequentially arranged in the row direction and the column direction respectively, and the display panel also includes multiple signal lines extending in the row direction and the column direction respectively. The pixel units include first pixel units sequentially arranged in the row direction. The signal lines include first signal lines extending in the column direction.

The drive compensation system includes a variation curve determination module, a compensation coefficient determination module, and a drive compensation module.

The variation curve determination module is configured to determine the impedance and capacitive reactance variation curve of the first signal line in the column direction and/or determine the charge rate variation curve of first pixel units in the row direction.

The compensation coefficient determination module is configured to determine compensation coefficient for a respective pixel unit in the column direction and/or the row direction according to the impedance and capacitive reactance variation curve of the first signal line in the column direction and/or the charge rate variation curve of first pixel units in the row direction.

The drive compensation module is configured to compensate the compensation coefficients for the respective pixel unit in the column direction and/or the row direction to the drive signal of the respective pixel unit to drive the respective pixel unit.

In a third aspect, an embodiment of the present disclosure provides a display device. The device applies any of the drive compensation method of a display panel described in the first aspect.

In the technical solutions provided by embodiments of the present disclosure, first, the impedance and capacitive reactance variation curve of the first signal line in the column direction is determined. Moreover/Alternatively, the charge rate variation curve of first pixel units in the row direction is determined. Then the compensation coefficient for the respective pixel unit in the column direction and/or the row direction are determined according to the impedance and capacitive reactance variation curve of the first signal line in the column direction and/or the charge rate variation curve of first pixel units in the row direction. Finally, the compensation coefficients for the respective pixel unit in the column direction and/or the row direction are compensated to the drive signal of the respective pixel unit to drive the respective pixel unit. In this manner, the compensation drive of the display panel is implemented. In the embodiments of the present disclosure, the display unevenness problem of the display panel caused by the impedance and capacitive reactance of a signal line can be solved, and influence factors and differences can be analyzed based on the generation principle of display unevenness in the row direction and the column direction. Then the compensation coefficient of each pixel unit is determined. The compensation coefficient is used to compensate the drive signal, so that the brightness difference caused by an impedance and capacitive reactance difference and a charge rate difference is canceled or weakened. Thus, the display panel is enabled to overcome the problem of uneven display.

DETAILED DESCRIPTION

Figure 1:
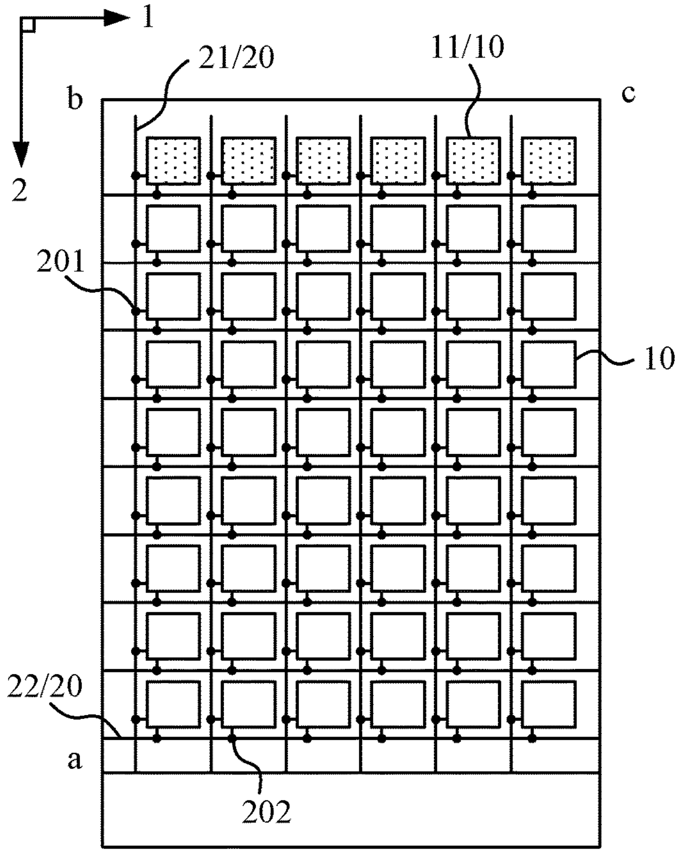
FIG. 1 is a diagram illustrating the structure of a display panel according to an embodiment of the present disclosure.

Hereinafter the present disclosure is further described in detail in conjunction with the drawings and embodiments. It is to be understood that the specific embodiments set forth below are intended to illustrate and not to limit the present disclosure. Additionally, it is to be noted that, for ease of description, only part, not all, of structures related to the present disclosure are illustrated in the drawings.

Figure 2:
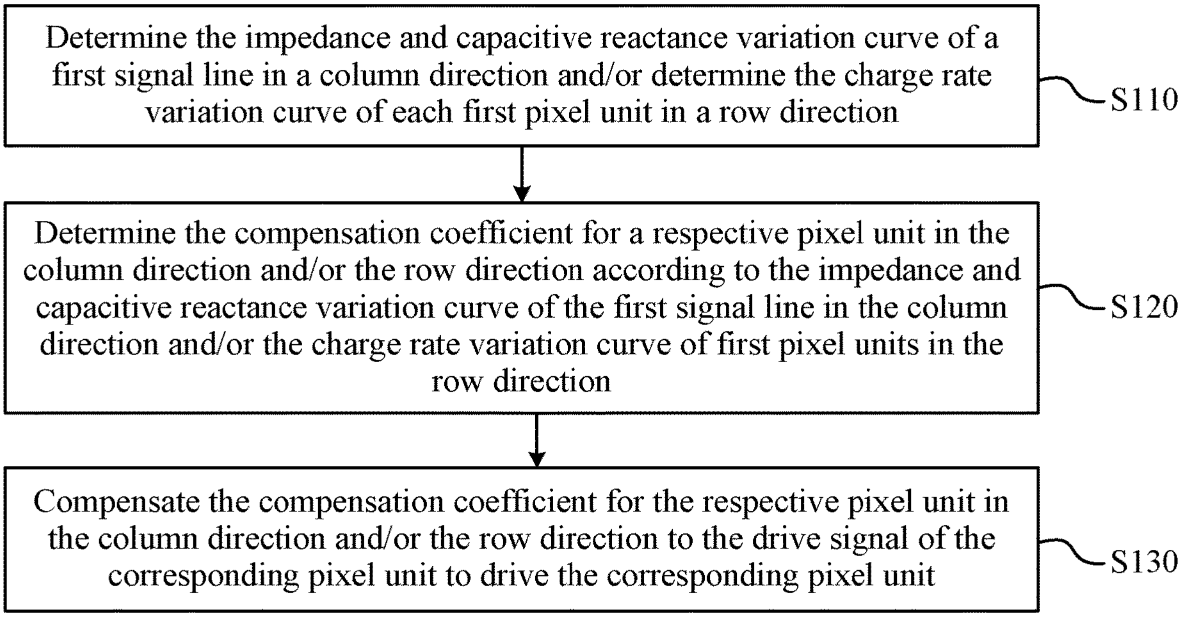
FIG. 2 is a flowchart of a drive compensation method of a display panel according to an embodiment of the present disclosure.

FIG. 1 is a diagram illustrating the structure of a display panel according to an embodiment of the present disclosure. FIG. 2 is a flowchart of a drive compensation method of a display panel according to an embodiment of the present disclosure. Referring to FIGS. 1 and 2, first, the drive compensation method provided by this embodiment of the present disclosure is based on a type of display panel as shown in FIG. 1. Specifically, the display panel may include multiple pixel units 10 sequentially arranged in a row direction 1 and a column direction 2 respectively, and the display panel also includes multiple signal lines 20 extending in the row direction 1 and the column direction 2 respectively (where the number of pixel units 10 and the number of signal lines 20 are only examples and not limitation). The pixel units 10 include first pixel units 11 sequentially arranged in the row direction 1. The signal lines 20 include first signal lines 21 extending in the column direction 2. The signal lines 20 are responsible for providing drive signals to pixel driving circuits (not shown in FIG. 1) in the pixel units 10. For example, the signal lines 20 may be data signal lines extending in the column direction and responsible for providing data signals to the pixel driving circuits or scan signal lines extending in the row direction and responsible for providing scan signals to the pixel driving circuits. On this basis, the drive compensation method provided by this embodiment of the present disclosure may include the steps below.

In S110, the impedance and capacitive reactance variation curve of a first signal line in the column direction is determined. Moreover/Alternatively, the charge rate variation curve of first pixel units in the row direction is determined.

Figure 3:
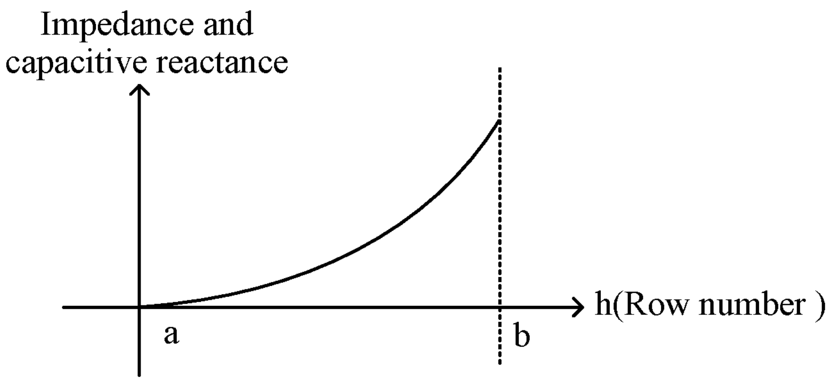
FIG. 3 is a diagram of an impedance and capacitive reactance variation curve of a first signal line according to an embodiment of the present disclosure.

The first signal line 21 herein refers to a type of signal line 20 extending in the column direction 2. The first signal line 21 extends in the column direction 2. Since the first signal line 21 is connected to multiple pixel units 10, there may be different impedance and capacitive reactance at different positions in the column direction 2. FIG. 3 is a diagram of an impedance and capacitive reactance variation curve of a first signal line according to an embodiment of the present disclosure. FIG. 3 is an example of the impedance and capacitive reactance variation curve of the same first signal line 21 on the display panel in FIG. 1 from point a to point b. Referring to FIGS. 1 and 3, the farther away from the signal starting point of the first signal line 21 is, the greater the impedance and capacitive reactance on the first signal line 21 is. When the pixel units 10 are driven to emit light, the drive signal transmitted on the first signal line 21 may be gradually seriously attenuated due to the gradually increasing impedance and capacitive reactance in the column direction 2. As a result, the drive current generated by a corresponding drive transistor decreases gradually, and thus the brightness of a pixel unit 10 that is farther away from the signal starting point of the first signal line 21 becomes darker. It is to be added that the signal lines 20 receive drive signals from signal lines 20 on fan-out wires, so the signal starting points of the signal lines 20 may be understood as nodes connected to the fan-out wires. A data line extending in the column direction 2 is used as an example, and the signal starting point of the data line is an endpoint adjacent to a side of the driver chip of the display panel.

Figure 4:
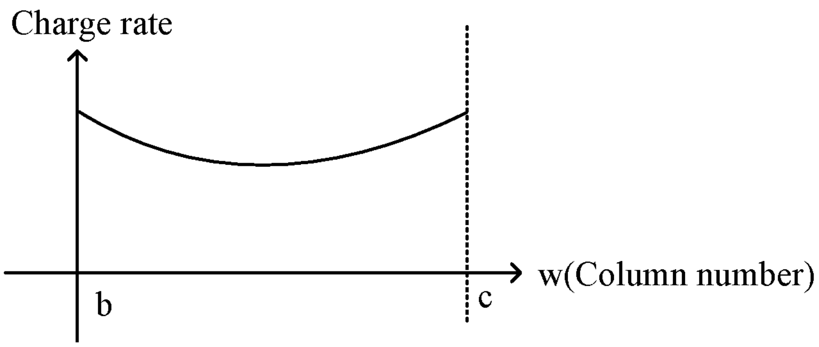
FIG. 4 is a diagram of a charge rate variation curve of a first pixel unit according to an embodiment of the present disclosure.

The first pixel units 11 refer to pixel units 10 sequentially arranged in the row direction 1, and the first pixel units 11 are electrically connected to signal lines 20 extending in the row direction 1. The signal lines 20 extending in the row direction 1 may be second signal lines 22. FIG. 4 is a diagram of a charge rate variation curve of a first pixel unit according to an embodiment of the present disclosure. FIG. 4 is an example of the charge rate variation curve of the same second signal line 22 on the display panel in FIG. 1 from point b to point c. Referring to FIGS. 1 and 4, similarly, it can be known that the second signal line 22 also has impedance and capacitive reactance, and that the farther away from a signal starting point is, the greater the resistance-capacitance impedance thereon is. Since the second signal line 22 generally provides a pixel driving circuit with a signal that is essentially a timing, such as a scan signal. The attenuation of the signal due to impedance and capacitive reactance generally affects the charging process of the pixel driving circuit. As a result, the charging duration is shortened, or the charging effect is not good. Furthermore, the charging efficiency is reduced, thereby reducing the brightness of the corresponding pixel unit. It is to be noted that since a signal line 20 extending in the row direction 1 may generally adopt a dual-end drive, that is, the same drive signal is provided at two ends of the second signal line 22 at the same time. Thus, on the display panel, the brightness of first pixel units 11 adjacent to an edge is higher, while the brightness of first pixel units 11 adjacent to the middle is darker.

This step is essentially a process of confirming the change in the impedance and capacitive reactance on the first signal line 21 and the charging efficiency of different first pixel units 11 based on the preceding working principle, so that the direct influence factors causing display unevenness may be known.

It is to be emphasized that the change in the impedance and capacitive reactance of the first signal line 21 extending in the column direction 2 causes display unevenness in the column direction of the display panel, and the change in the charge rate of the first pixel units 11 sequentially arranged in the row direction 1 causes display unevenness in the row direction of the display panel. In an actual application process, the severity of the display unevenness in the column direction and the row direction may be considered, and only the display unevenness in the column direction is compensated, or only the display unevenness in the row direction is compensated, or the display unevenness in the column direction and the row direction is compensated at the same time. Thus, in this step, it is possible to choose to confirm at least one of the change in the impedance and capacitive reactance of the first signal line 21 and/or the change in the charge rate of the first pixel units 11 to facilitate subsequent targeted compensation.

In S120, the compensation coefficient for a respective pixel unit in the column direction and/or the row direction are determined according to the impedance and capacitive reactance variation curve of the first signal line in the column direction and/or the charge rate variation curve of first pixel units in the row direction.

Figure 5:
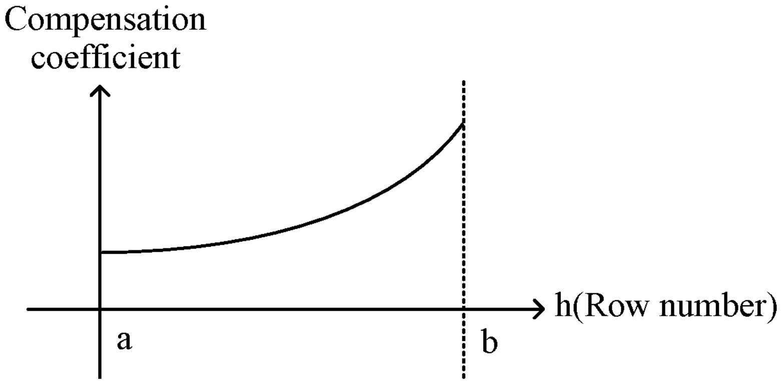
FIGS. 5 and 6 are diagrams of the compensation coefficients for pixel units in a column direction and a row direction according to an embodiment of the present disclosure.
Figure 6:
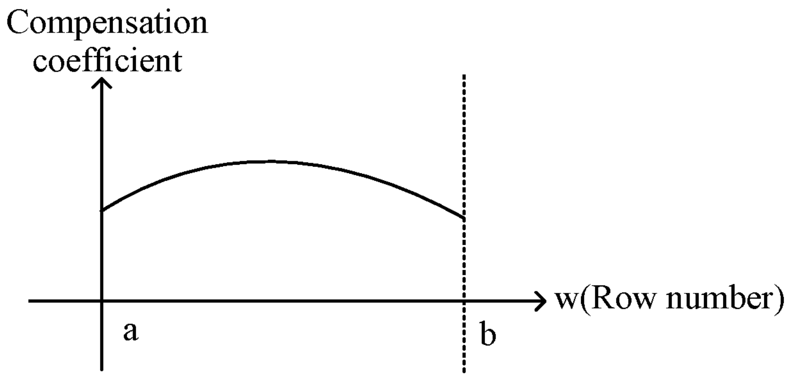

FIGS. 5 and 6 are diagrams of the compensation coefficient for each pixel unit in a column direction and a row direction according to an embodiment of the present disclosure. FIG. 5 is an example of the compensation coefficient curve of each pixel unit from point a to point b connected by the same first signal line 21 on the display panel in FIG. 1. FIG. 6 is an example of the compensation coefficient curve of each first pixel unit from point b to point c connected by the same second signal line 22 on the display panel in FIG. 1. Referring to FIG. 1 and FIGS. 3 to 5, as can be seen from the preceding steps, the change in the impedance and capacitive reactance of a signal line and the change in the charge rate of a pixel unit are direct influence factors that cause uneven display of the display panel in the column direction and the row direction respectively. On the basis of the determination of the impedance and capacitive reactance variation curve and the charge rate variation curve in step S110, the difference between the impedance and capacitive reactance on the first signal line 21 and a standard value and the difference between the charge rate and a standard charge rate may be considered, and then the brightness difference from standard brightness caused by the impedance and capacitive reactance and the charge rate is determined. In this manner, the compensation coefficient of a corresponding pixel unit may be reversely set. Since the impedance and capacitive reactance difference of the first signal line and the charge rate difference of the first pixel unit may cause the brightness differences in the column direction and the row direction respectively, when a compensation coefficient is set, it is necessary to set the brightness compensation in the column direction and the row direction for the same pixel unit considering the brightness differences in the column direction and the row direction. In other words, it can be considered to set two kinds of compensation coefficients for the same pixel unit at the same time. In addition, it can be seen from comparison between FIG. 3 and FIG. 5 that the greater the impedance and capacitive reactance of the first signal line 21 in the column direction is, the greater the compensation coefficient corresponding to the impedance and capacitive reactance is. The compensation coefficient curve has the same change trend as the impedance and capacitive reactance. It can be seen from comparison between FIG. 4 and FIG. 6 that the lower the charge rate of each first pixel unit 11 in the row direction is, the higher the corresponding compensation coefficient is. The change trend of the compensation coefficient curve is opposite to the change trend of the charge rate.

In S130, the compensation coefficient for the respective pixel unit in the column direction and/or the row direction are compensated to the drive signal of the respective pixel unit to drive the respective pixel unit.

The preceding steps S110 and S120 are data analysis and calculation processes, and this step S130 is an actual driving process, that is, a compensation coefficient needs to be compensated into a drive signal in the actual driving process of providing the drive signal to a pixel driving circuit. Further referring to FIGS. 5 and 6, it is possible to determine the compensation coefficient of any pixel unit based on the variation curves of the compensation coefficients in the column direction and the row direction, and the compensation coefficient may be compensated to the drive signal of the corresponding pixel unit. The pixel unit is driven by the compensated drive signal. In this manner, the brightness difference caused by an impedance and capacitive reactance difference and a charge rate difference can be canceled or weakened. Thus, the display panel is enabled to overcome the problem of uneven display. It is to be understood by those skilled in the art that the object compensated by the compensation coefficient is the drive signal of the pixel unit. The drive signal may specifically be a data signal or a scan signal. The drive signal should be a drive signal that affects the brightness of the pixel unit.

In the preceding embodiment, first, the impedance and capacitive reactance variation curve of the first signal line in the column direction is determined. Moreover/Alternatively, the charge rate variation curve of each first pixel unit in the row direction is determined. Then the compensation coefficients for each pixel unit in the column direction and/or the row direction are determined according to the impedance and capacitive reactance variation curve of the first signal line in the column direction and/or the charge rate variation curve of each first pixel unit in the row direction. Finally, the compensation coefficients for each pixel unit in the column direction and/or the row direction are compensated to the drive signal of the corresponding pixel unit to drive the corresponding pixel unit. In this manner, the compensation drive of the display panel is implemented. In this embodiment of the present disclosure, the display unevenness problem of the display panel caused by the impedance and capacitive reactance of a signal line can be solved, and influencing factors and differences can be analyzed based on the generation principle of display unevenness in the row direction and the column direction. Then the compensation coefficient of each pixel unit is determined. The compensation coefficient is used to compensate the drive signal, so that the brightness difference caused by an impedance and capacitive reactance difference and a charge rate difference is canceled or weakened. Thus, the display panel is enabled to overcome the problem of uneven display.

Further referring to FIG. 1, it is to be noted that in this display panel, a first signal line 21 includes multiple first nodes 201, and multiple first pixel units 11 in the same column are electrically connected to the first signal line 21 through the first nodes 201 respectively. Based on this panel structure, in step S110 of the drive compensation method provided by the preceding embodiment, the impedance and capacitive reactance variation curve of the first signal line in the column direction is determined in the steps below.

In S111, the impedance and capacitive reactance of at least part of first nodes on the first signal line is acquired.

Since each first pixel unit 11 is electrically connected to the first signal line 21 through a first node 201 to receive the drive signal of the first signal line 21. Conversely, the first signal line 21 is electrically connected to the first pixel unit 11 through the first node 201, and the impedance and capacitive reactance of each first node 201 sequentially arranged on the first signal line 21 may also be different due to the number of first pixel units 11 previously connected. In other words, the farther a first node 201 is away from a signal starting point, the greater the impedance and capacitive reactance on the first node 201 is. The impedance and capacitive reactance of first nodes 201 may reflect the change in the impedance and capacitive reactance on the first signal line 21. In this step, the impedance and capacitive reactance of part of the first nodes 201 is acquired, and the impedance and capacitive reactance of the part of the first nodes 201 is essentially used to approximately represent the change in the impedance and capacitive reactance of the first signal line 21.

In S112, the impedance and capacitive reactance variation curve of the first signal line in the column direction is formed by fitting according to the impedance and capacitive reactance of the at least part of the first nodes on the first signal line.

Referring to FIGS. 1 and 3, in this step, the impedance and capacitive reactance of part of nodes 201 on the first signal line 21 is essentially used to replace the overall change in the impedance and capacitive reactance. Specifically, the change in the impedance and capacitive resistance of the entire first signal line 21 is acquired by fitting. The impedance and capacitive reactance variation curve of the signal line may be formed by fitting according to the impedance and capacitive reactance of the part of nodes. In this manner, the impedance and capacitive reactance at any position on the first signal line 21 may be conveniently confirmed, that is, the impedance and capacitive reactance difference at any position on the first signal line 21 may be conveniently acquired, and the compensation coefficient of any pixel unit connected to the first signal line 21 is determined.

At the same time, in step S110, the charge rate variation curve of first pixel units in the row direction is determined in the steps below.

In S113, the charge rates of at least part of the first pixel units sequentially arranged in the row direction are acquired.

Similarly, in this step, the charge rates of at least part of the first pixel units 11 are used to approximately represent or represent the change in the charge rates of pixel units 10 in the same row, and the details are not repeated here.

In S114, the charge rate variation curve of first pixel units in the row direction is formed by fitting according to the charge rates of the at least part of the first pixel units sequentially arranged in the row direction.

Referring to FIGS. 1 and 4, similarly, this step is also a process of obtaining the change in the charge rates of pixel units in the same row according to the charge rates of part of the first pixel units 11 by fitting. The charge rate variation curve of first pixel units 11 in the row direction 1 may be formed by fitting, and then the charge rate of any pixel unit 10 on the same row may be obtained. In this manner, it is convenient to determine the compensation coefficient of each pixel unit 10 based on the difference between the charge rate and a standard charge rate.

Optionally, in at least part of the first nodes 201 selected in the preceding steps S111 and S112, the spacing between each first node 201 maintains equal. In at least part of the first pixel units 11 in steps S113 and S114, the spacing between each first pixel unit 11 maintains equal.

At this time, for at least part of the first nodes 201 selected in steps S111 and S112, since the spacing maintains equal, the part of the first nodes 201 may relatively accurately cover the impedance and capacitive reactance values at different positions on the first signal line 21. Thus, the change in the impedance and capacitive reactance obtained by fitting according to the part of the first nodes 201 is more in line with the actual change in the impedance and capacitive reactance of the first signal line 21. In this manner, it is possible to ensure that the obtained impedance and capacitive reactance variation curve is more accurate, so that the compensation coefficient can be more accurately and effectively compensated for display unevenness. Similarly, for at least part of the first pixel units 11 selected in steps S113 and S114, since the spacing maintains equal, the first pixel units 11 at different positions in the same row may be basically covered. The charge rate variation curve of pixel units obtained by fitting according to the charge rates is more accurate, the compensation coefficient is more accurate, and display unevenness can be effectively compensated.

In addition, optionally, the number of the at least part of the first nodes 201 is greater than or equal to one tenth of a total number of rows of the display panel. Moreover/Alternatively, the number of the at least part of the first pixel units 11 is greater than or equal to one tenth of a total number of columns of the display panel. Thus, when curve fitting is performed in step S112 and step S114, sufficient samples are available, that is, the impedance and capacitive reactance of a sufficient number of first nodes 201 and the charge rates of a sufficient number of first pixel units 11. In this manner, it is also conducive to more accurate curve fitting, acquiring a more accurate change rate curve, and effectively compensating for display drive. The number of first nodes 201 selected in the column direction is used as an example. When there are 2400 rows of pixels in the column direction, 240 measurement points may be selected for fitting an impedance and capacitive reactance variation curve. Further, for the preceding step S111 described above in which the impedance and capacitive reactance of at least part of first nodes on the first signal line is acquired, this embodiment of the present disclosure provides two acquisition methods. Specifically, step S111 may include the steps below.

In S1110, the impedance and capacitive reactance of the at least part of the first nodes on the first signal line is obtained through an actual test by using a test display panel. Alternatively, the impedance and capacitive reactance of the at least part of the first nodes on the first signal line is obtained through a simulation by using a simulation display panel.

The test display panel refers to a display panel specially designed for performing a test. In the test panel, at least part of the first nodes 201 have test feedback lines, so that the impedance and capacitive reactance value of a first node 201 may be conveniently acquired. In addition, simulation software may be used to simulate a display panel, and the impedance and capacitive reactance values of at least part of the first nodes 201 on the first signal line 21 in the simulation display panel may be obtained by simulation according to the simulation software. The following is a detailed introduction to the two preceding acquisition methods of impedance and capacitive reactance with practical examples.

In an embodiment, in step S1110, the impedance and capacitive reactance of the at least part of the first nodes on the first signal line is obtained in the steps below through the actual test by using the test display panel.

In S1111, the voltage drops of the at least part of the first nodes on the first signal line and the current on the first signal line are obtained through the actual test by using the test display panel.

Figure 7:
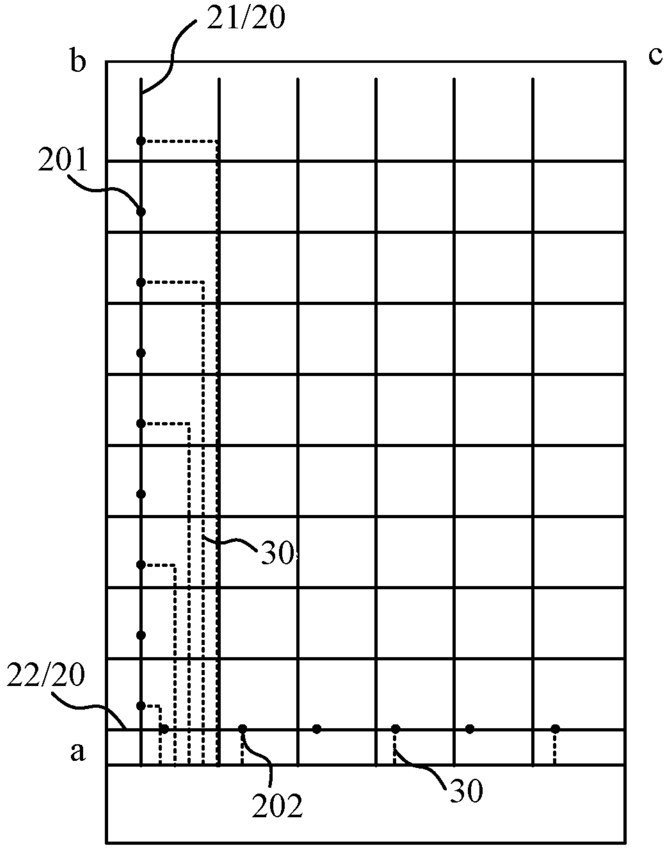
FIG. 7 is a diagram illustrating the structure of a test display panel according to an embodiment of the present disclosure.

FIG. 7 is a diagram illustrating the structure of a test display panel according to an embodiment of the present disclosure. Referring to FIGS. 1 and 7, as described above, test feedback lines 30 are configured for at least part of the first nodes 201 on the same first signal line 21 in the test display panel respectively. A drive signal is provided to the first signal line 21, and a test feedback line is used to receive the voltage drop and current on the corresponding first node 201. Then the current electrical state of the first node 201 may be acquired, that is, the impedance and capacitive reactance may be calculated.

In S1112, the impedance and capacitive reactance of the at least part of the first nodes on the first signal line is calculated according to the voltage drops of the at least part of the first nodes on the first signal line, the current on the first signal line, and a voltage drop calculation formula $\Delta V1=I1\times n1\times(R1+C1)$.

$\Delta V1$ denotes the voltage drop of a first node on the first signal line. I1 denotes the current on the first signal line. n1 denotes the sequence number of the current first node on the first signal line. R1 denotes the impedance of each pixel unit sequentially arranged in the column direction. C1 denotes the capacitive reactance of each pixel unit sequentially arranged in the column direction.

Further referring to FIGS. 1 and 7, based on the voltage drop and current of each first node 201 fed back by each test feedback line 30, the impedance and capacitive reactance of each first node 201 with respect to the signal starting point may be inversely deduced according to the voltage drop formula. Thus, the change in the impedance and capacitive reactance on the entire first signal line 21 may be fitted according to the impedance and capacitive reactance of part of the first nodes 201.

In another embodiment, in step S1110, the impedance and capacitive reactance of the at least part of the first nodes on the first signal line is obtained in the steps below through the simulation by using the simulation display panel.

In S1113, the voltage drops of the at least part of the first nodes on the first signal line and the current on the first signal line are obtained through the simulation by using the simulation display panel.

In S1114, the impedance and capacitive reactance of the at least part of the first nodes on the first signal line is calculated according to the voltage drops of the at least part of the first nodes on the first signal line, the current on the first signal line, and the voltage drop calculation formula $\Delta V1=I1\times n1\times(R1+C1)$.

$\Delta V1$ denotes the voltage drop of a first node on the first signal line. I1 denotes the current on the first signal line. n1 denotes the sequence number of the current first node on the first signal line. R1 denotes the impedance of each pixel unit sequentially arranged in the column direction. C1 denotes the capacitive reactance of each pixel unit sequentially arranged in the column direction.

The process of calculating the impedance and capacitive reactance of a first node in steps S1113 and S1114 is basically the same as the process of calculating the impedance and capacitive reactance of a first node in steps S1111 and S1112. The only difference is that steps S1113 and S1114 are implemented by the simulation software. In the simulation process, there is no need to configure a test feedback line for the first node 201, the voltage drop of the first node 201 and the current on the first signal line 21 may be directly acquired. Then the impedance and capacitive reactance of any first node 201 may be inversely deduced according to the preceding voltage drop formula. The change in the impedance and capacitive reactance on the entire first signal line 21 may be fitted according to the impedance and capacitive reactance of part of the first nodes 201.

Further, for step S113 described above in which the charge rates of at least part of the first pixel units sequentially arranged in the row direction are acquired, this embodiment of the present disclosure also provides two acquisition methods. Specifically, step S113 may include the steps below.

In S1130, the charge rates of the at least part of the first pixel units sequentially arranged in the row direction are obtained through the actual test by using the test display panel. Alternatively, the charge rates of the at least part of the first pixel units sequentially arranged in the row direction are obtained through the simulation by using the simulation display panel.

The test display panel here also refers to a display panel specially designed for performing a test. The test panel is also provided with a test feedback line configured to acquire a relevant signal of the charge rate of the first pixel unit 11. Additionally, simulation software may be used to simulate a display panel, and the charge rate of any first pixel unit 11 in the simulation display panel may be obtained by simulation according to the simulation software. The following is a detailed introduction to the two preceding acquisition methods of the charge rate of a first pixel unit with practical examples.

In an embodiment, in S1130, the charge rates of the at least part of the first pixel units sequentially arranged in the row direction are obtained in the steps below through the actual test by using the test display panel.

In S1131, the voltage drops of at least part of second nodes on a second signal line and the current on the second signal line are obtained through the actual test by using the test display panel. A first pixel unit is electrically connected to the second signal line through a second node.

In S1132, the impedance and capacitive reactance of the at least part of the second nodes on the second signal line is calculated according to the voltage drops of the at least part of the second nodes on the second signal line, the current on the second signal line, and a voltage drop calculation formula $\Delta V2=I2\times n2\times(R2+C2)$. The charge rate of the first pixel unit electrically connected to the second node is replaced by the impedance and capacitive reactance of the second node.

$\Delta V2$ denotes the voltage drop of a second node on the second signal line. I2 denotes the current on the second signal line. n2 denotes the sequence number of the current second node on the second signal line. R2 denotes the impedance of each pixel unit sequentially arranged in the row direction. C2 denotes the capacitive reactance of each pixel unit sequentially arranged in the row direction.

First, it is to be noted that referring to FIGS. 1 and 7, the signal lines 20 extending in the row direction 1 are second signal lines 22. Each first pixel unit 11 is electrically connected to a second signal line 22 through a second node 202. Similarly, the preceding steps S1131 and S1132 essentially include the process of calculating the impedance and capacitive reactance of a second node 202 on the second signal line 22. The calculation process is the same as the calculation process of the impedance and capacitive reactance of a first node 201 on the first signal line 21, that is, the voltage drop corresponding to the second node 202 and the current on the second signal line 22 may be directly obtained through a test feedback line 30. Then the impedance and capacitive reactance of the second node 202 is inversely deduced according to the voltage drop formula. Then the change in the impedance and capacitive reactance on the entire second signal line 22 is fitted. However, the preceding steps actually use the impedance and capacitive reactance of the second node 202 to represent the charge rate of the first pixel unit 11 connected to the second node 202 to calculate the change in the charge rate of each first pixel unit 11. It is to be understood that since the charge rate of the first pixel unit 11 is mainly affected by the delay and attenuation of the drive signal on the second signal line 22, and the delay and attenuation of the drive signal are essentially caused by the impedance and capacitive reactance on the second signal line 22, the charge rate of the corresponding first pixel unit 11 may be represented to a certain extent according to the impedance and capacitive reactance of the second node 202 on the second signal line 22. In this manner, the charge rate curve of the entire row of the first pixel units 11 may be fitted according to the charge rates of the part of the first pixel units 11.

In another embodiment, in S1130, the charge rates of the at least part of the first pixel units sequentially arranged in the row direction are obtained in the steps below through the simulation by using the simulation display panel.

In S1133, the voltage drops of the at least part of the second nodes on the second signal line and the current on the second signal line are obtained through the simulation by using the simulation display panel. A first pixel unit is electrically connected to the second signal line through a second node.

In S1134, the impedance and capacitive reactance of the at least part of the second nodes on the second signal line is calculated according to the voltage drops of the at least part of the second nodes on the second signal line, the current on the second signal line, and the voltage drop calculation formula $\Delta V2=I2\times n2\times(R2+C2)$. The charge rate of the first pixel unit electrically connected to the second node is replaced by the impedance and capacitive reactance of the second node.

$\Delta V2$ denotes the voltage drop of a second node on the second signal line. I2 denotes the current on the second signal line. n2 denotes the sequence number of the current second node on the second signal line. R2 denotes the impedance of each pixel unit sequentially arranged in the row direction. C2 denotes the capacitive reactance of each pixel unit sequentially arranged in the row direction.

Similarly, the process of calculating the impedance and capacitive reactance of a second node in steps S1133 and S1134 is basically the same as the process of calculating the impedance and capacitive reactance of a second node in steps S1131 and S1132. The only difference is that steps S1133 and S1134 are implemented by the simulation software. At the same time, step S1134 is the same as step S1132. The charge rate of the corresponding first pixel unit 11 is represented according to the impedance and capacitive reactance of the second node 202. Then the charge rate curve of the entire row of the first pixel units 11 is fitted according to the charge rates of the part of the first pixel units 11.

In addition, in the preceding step S1130 in which the charge rates of the at least part of the first pixel units sequentially arranged in the row direction are obtained through the simulation by using the simulation display panel, this embodiment of the present disclosure also provides another direct calculation method. Specifically, the preceding step may include the steps below.

In S1135, a charge simulation model is established for the first pixel units sequentially arranged in the row direction.

First, it is to be noted that this embodiment is also implemented by simulation software. In the simulation software, the charge simulation model of the display panel needs to be established in advance to simulate the charging process and charging state of each first pixel unit in the display panel during display drive.

In S1136, charging of first pixel units in the same row within a unit time is simulated by using the charge simulation model to obtain the voltages of second nodes on the second signal line electrically connected to the at least part of the first pixel units.

In S1137, the ratio of the voltage of a second node to a target voltage value is calculated, and the ratio is used as the charge rate of the first pixel unit electrically connected to the second node.

The preceding steps S1136 and S1137 are processes of calculating the charge rates of part of the first pixel units 11 by using the charge simulation model. Specifically, a first pixel unit 11 is connected to a second node 202 on the second signal line 22. Since the impedance and capacitive reactance on the second signal line 22 may cause the voltage attenuation of each second node 202, when the second signal line 22 provides a drive signal to the first pixel unit 11 through the second node 202, the drive signal causes the first pixel unit 11 to be incompletely charged due to the voltage attenuation, that is, the voltage attenuation may be directly reflected on the charge rate of the first pixel unit 11. As a result, the charge rate of each first pixel unit 11 in the same row is different. On the basis of this principle, the voltage of any second node 202 may be obtained by the charge simulation model in the process of simulation charging. The comparison between the actual voltage of the second node 202 during the charging process and the target voltage value can reflect the charge rate of the first pixel unit 11 to a certain extent. Thus, the ratios of the voltages of part of the second nodes 202 to target voltage values are calculated, and the ratios are used as the charge rates of part of the first pixel units 11 electrically connected to the second nodes. The change in the charge rate of each first pixel unit 11 connected to the second signal line 22 can be further fitted.

In the preceding embodiment, different acquisition methods are provided for the change in the impedance and capacitive reactance and the change in the charge rate. After the impedance and capacitive reactance variation curve and the charge rate variation curve are obtained, the present disclosure also provides an embodiment for a compensation coefficient and a compensation process. After step S120 in the preceding embodiment, the steps below may be added.

In S121, the compensation coefficient matrix of pixel units in the display panel is calculated according to the compensation coefficients for each pixel unit in the column direction and/or the row direction.

On this basis, step S130 in the preceding embodiment may be replaced by step S131 in which the compensation coefficients for each pixel unit in the compensation coefficient matrix are compensated to the initial data voltage and/or the scan signal of the corresponding pixel unit to obtain a compensation data voltage and/or a compensation scan signal to drive the corresponding pixel unit.

Figure 8:
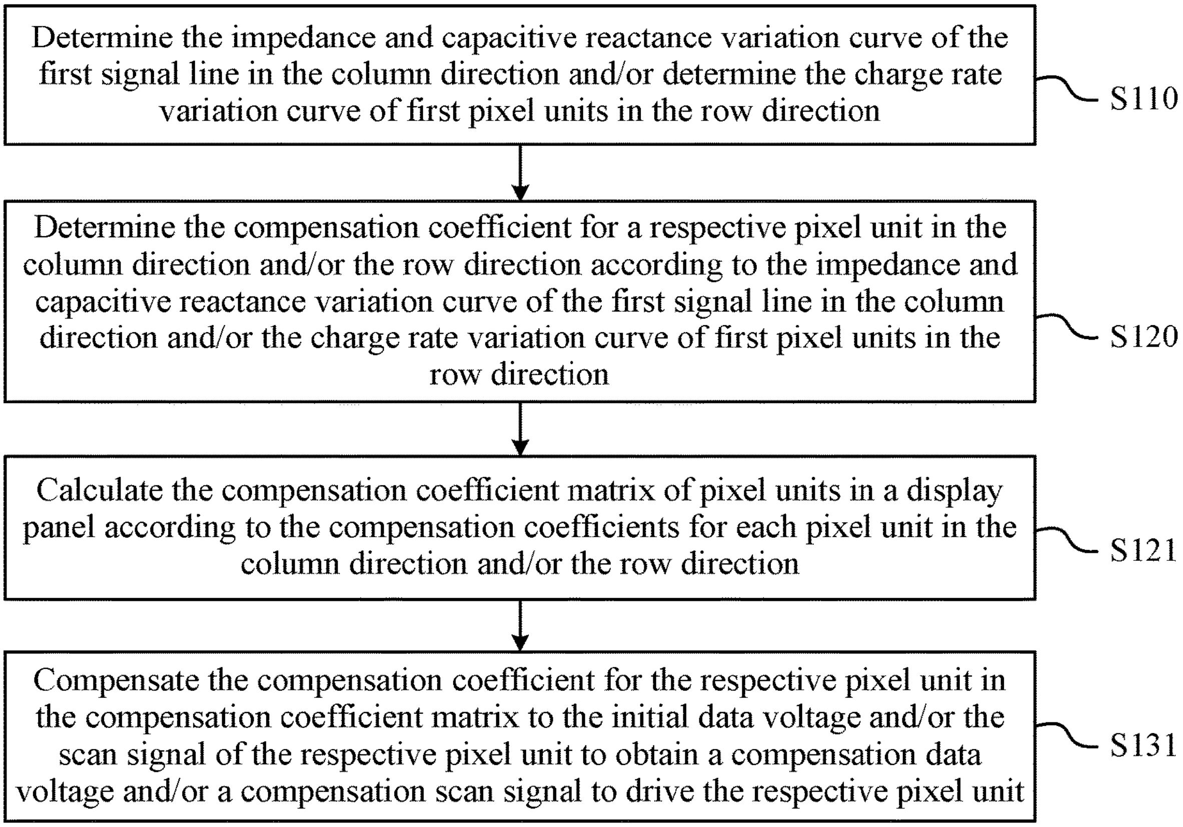
FIG. 8 is a flowchart of another drive compensation method of a display panel according to an embodiment of the present disclosure.

Specifically, FIG. 8 is a flowchart of another drive compensation method of a display panel according to an embodiment of the present disclosure.

In S110, the impedance and capacitive reactance variation curve of the first signal line in the column direction is determined. Moreover/Alternatively, the charge rate variation curve of first pixel units in the row direction is determined.

In S120, the compensation coefficients for each pixel unit in the column direction and/or the row direction are determined according to the impedance and capacitive reactance variation curve of the first signal line in the column direction and/or the charge rate variation curve of first pixel units in the row direction.

In S121, the compensation coefficient matrix of pixel units in the display panel is calculated according to the compensation coefficients for each pixel unit in the column direction and/or the row direction.

In S131, the compensation coefficients for each pixel unit in the compensation coefficient matrix are compensated to the initial data voltage and/or the scan signal of the corresponding pixel unit to obtain the compensation data voltage and/or the compensation scan signal to drive the corresponding pixel unit.

The preceding steps S121 and S131 are specific display drive compensation processes of compensation coefficients. Considering that each pixel unit 10 arranged in an array on the display panel may be unevenly displayed in the column direction 2 or the row direction 1, it is necessary to arrange compensation coefficients in an array form corresponding to each pixel unit 10, that is, each pixel unit 10 is corresponding to a compensation coefficient. In this manner, a compensation coefficient is compensated to the drive signal of the corresponding pixel unit 10 in the driving process, thereby alleviating the brightness difference of the pixel units 10 in the same column and in the same row and ensuring that the overall display of the display panel is even. In addition, essentially, since the brightness of each pixel unit in the display panel is implemented by the common drive of various drive signals, it is also possible to compensate for different drive signals in the process of performing drive compensation to adjust the brightness of a pixel unit. It is to be understood that a data signal and a scan signal are not only the factors affecting the brightness of the pixel unit, but also the way to adjust the brightness of the pixel unit. Thus, in this embodiment of the present disclosure, optionally, a compensation coefficient is compensated to at least one data signal of the drive signal and the scan signal to cancel and weaken the brightness difference between different pixel units caused by the impedance and capacitive reactance of a signal line and implement display evenness.

Table 1 is a compensation coefficient matrix provided by this embodiment of the present disclosure.

| | | |
|---|---|---|
| 1 * F(h) * G(0) | . . . 1 * F(h) * G(w/2) | . . . 1 * F(h) * G(w) |
| . . . | . . . . . . | . . . . . . |
| 1 * F(h/2) * G(0) | . . . 1 * F(h/2) * G(w/2) | . . . 1 * F(h/2) * G(w) |
| . . . | . . . . . . | . . . . . . |
| 1 * F(0) * G(0) | . . . 1 * F(0) * G(w/2) | . . . 1 * F(0) * G(w) |

Referring to Table 1, optionally, a compensation coefficient in the compensation coefficient matrix is F(x)*G(y). F(x) denotes the compensation coefficient formula of each pixel unit in the column direction. G(y) denotes the compensation coefficient formula of each pixel unit in the row direction. x denotes the row number of a to-be-compensated pixel unit, y denotes the column number of the to-be-compensated pixel unit, $0 \le x \le h$, and $0 \le y \le w$. h denotes a total number of rows of the pixel units in the display panel. w denotes a total number of columns of the pixel units in the display panel. On this basis, the preceding step S131 may include the steps below.

The compensation coefficient F(x)*G(y) in the compensation coefficient matrix is multiplied by the data voltage of the pixel unit in the x-th row and the y-th column to obtain a compensation data voltage to drive the corresponding pixel unit.

Alternatively, the compensation coefficient F(x)*G(y) in the compensation coefficient matrix is multiplied by the scan signal of the pixel unit in the x-th row and the y-th column to obtain a compensation scan signal so that the pixel unit in the x-th row and the y-th column is driven.

Alternatively, a compensation coefficient F(x) in the compensation coefficient matrix is multiplied by the data voltage of a pixel unit in the x-th row to obtain a compensation data voltage. A compensation coefficient G(y) in the compensation coefficient matrix is multiplied by the scan signal of a pixel unit in the y-th column to obtain a compensation scan signal so that the pixel unit in the x-th row and the y-th column is driven.

In addition, considering that each pixel unit in the display panel includes multiple sub-pixels of different colors, when drive compensation is performed on a pixel unit, it may be considered that a sub-pixel is used as a basic unit for compensation. On this basis, specifically, the preceding step S131 may include the steps below.

In S1311, the compensation coefficients for each pixel unit in the column direction and/or the row direction are split into multiple corresponding sub-compensation coefficients according to the light emission proportioning ratio of multiple sub-pixels in the pixel units.

In S1312, the multiple sub-compensation coefficients are correspondingly compensated to the drive signals of the sub-pixels to drive the corresponding sub-pixels.

The light emission proportioning ratio of the sub-pixels indicates the brightness ratio required for a pixel unit to form light of a certain color when common color matching is performed on the sub-pixels of different colors. It is to be understood that when brightness compensation is required for the entire pixel unit, each sub-pixel constituting the pixel unit should share brightness compensation of a corresponding ratio, that is, a compensation coefficient of a certain ratio needs to be set for each sub-pixel. In this manner, the brightness compensation of the entire pixel unit is implemented after color matching through the respective brightness compensation of each sub-pixel. In actual operations, the compensation coefficient of the pixel unit may be split according to the light-emitting proportioning ratio of the sub-pixels to form corresponding sub-compensation coefficients. The sub-compensation coefficient of each sub-pixel may be considered as the component of the compensation coefficient of the pixel unit. The brightness of the sub-pixels compensated by the sub-compensation coefficients may be synthesized to present the brightness compensation of the entire pixel unit. In addition, it is to be understood that each sub-pixel is correspondingly provided with a pixel driving circuit. The driving process of the pixel driving circuit is essentially implemented by the reception of a drive signal by the pixel driving circuit. Thus, when a sub-pixel is compensated, a sub-compensation coefficient is actually loaded on the drive signal of the sub-pixel.

Similarly, considering that a pixel unit includes multiple sub-pixels of different colors, in this embodiment of the present disclosure, when brightness compensation is performed according to the impedance and capacitive reactance of the first signal line and the charge rates of the first pixel units, the compensation may also be performed based on subdivided sub-pixels. In other words, the impedance and capacitive reactance of the first signal line corresponding to each sub-pixel and the charge rate of the sub-pixels arranged in the row direction are determined, and then the brightness differences of the sub-pixels are compensated. The process of implementing sub-pixel brightness equalization is essentially the process of implementing pixel unit brightness equalization. On this basis, embodiments of the present disclosure also provide a corresponding embodiment. On the basis of the drive method of the preceding embodiment, in step S110, the impedance and capacitive reactance variation curve of the first signal line in the column direction is determined in the following step: The impedance and capacitive reactance variation curve of the first signal line in the column direction electrically connected to multiple sub-pixels of the same color sequentially arranged in the column direction is determined.

In step S110, the charge rate variation curve of first pixel units in the row direction is determined in the following step: The charge rate variation curve in the row direction of each sub-pixel of the same color sequentially arranged in the row direction is determined.

Further, step 320 in which the compensation coefficients for each pixel unit in the column direction and/or the row direction are determined according to the impedance and capacitive reactance variation curve of the first signal line in the column direction and/or the charge rate variation curve of first pixel units in the row direction may be replaced by the steps below.

The compensation coefficients for each sub-pixel in the column direction and/or the row direction are determined according to the impedance and capacitive reactance variation curve of the first signal line in the column direction electrically connected to the multiple sub-pixels of the same color sequentially arranged in the column direction and/or the charge rate variation curve in the row direction of each sub-pixel of the same color sequentially arranged in the row direction.

Step S130 in which the compensation coefficients for each pixel unit in the column direction and/or the row direction are compensated to the drive signal of the corresponding pixel unit to drive the corresponding pixel unit may be replaced by the steps below.

The compensation coefficients for each sub-pixel in the column direction and/or the row direction are compensated to the drive signal of the corresponding sub-pixel to drive the corresponding sub-pixel.

Figure 9:
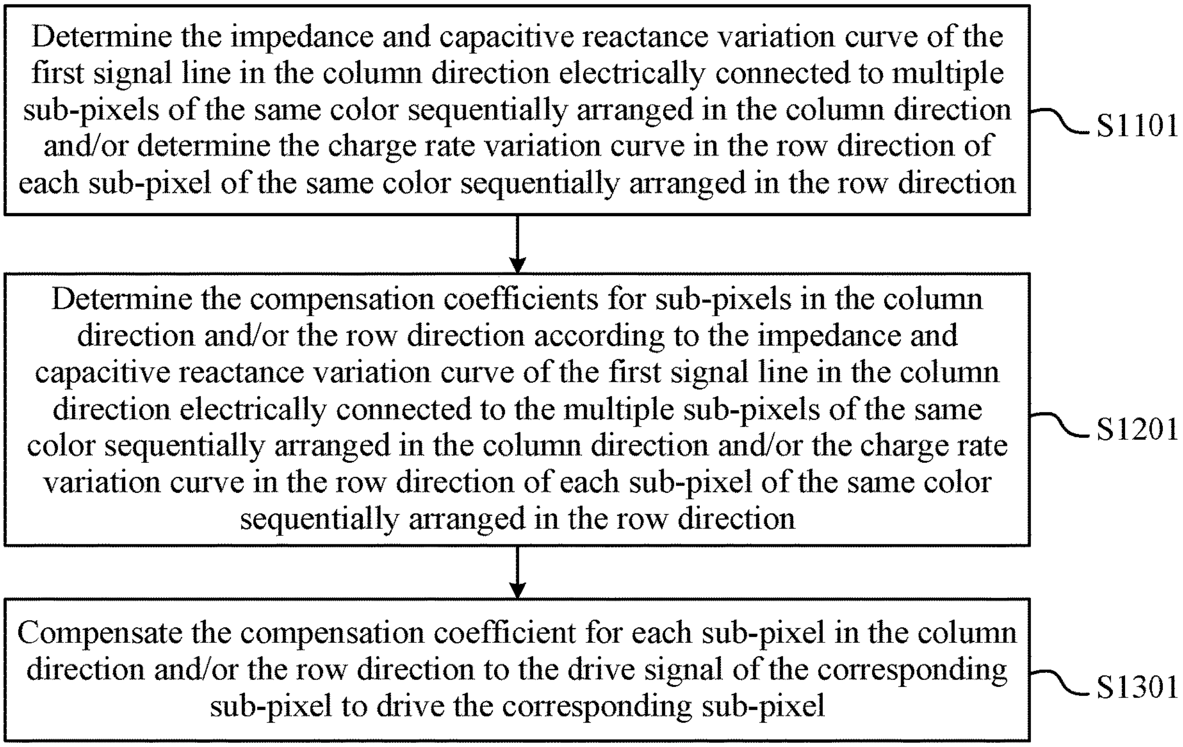
FIG. 9 is a flowchart of another drive compensation method of a display panel according to an embodiment of the present disclosure.

FIG. 9 is a flowchart of another drive compensation method of a display panel according to an embodiment of the present disclosure. Referring to FIG. 9, in another embodiment of the present disclosure, optionally, the drive compensation method includes the steps below.

In S1101, the impedance and capacitive reactance variation curve of the first signal line in the column direction electrically connected to the multiple sub-pixels of the same color sequentially arranged in the column direction is determined. Moreover/Alternatively, the charge rate variation curve in the row direction of each sub-pixel of the same color sequentially arranged in the row direction is determined.

In S1201, the compensation coefficients for each sub-pixel in the column direction and/or the row direction are determined according to the impedance and capacitive reactance variation curve of the first signal line in the column direction electrically connected to the multiple sub-pixels of the same color sequentially arranged in the column direction and/or the charge rate variation curve in the row direction of each sub-pixel of the same color sequentially arranged in the row direction.

In S1301, the compensation coefficients for each sub-pixel in the column direction and/or the row direction are compensated to the drive signal of the corresponding sub-pixel to drive the corresponding sub-pixel.

It is to be understood that in this embodiment, the determination of the impedance and capacitive reactance and the charge rate and the drive compensation are performed by using a sub-pixel as the minimum unit, so that the sub-pixel having the brightness difference may be compensated more accurately. Then each sub-pixel is lighted up with standard brightness. Moreover, the target brightness and the target color of a pixel unit are implemented by color matching and synthesis of sub-pixels, thereby avoiding uneven brightness caused by the brightness difference of the sub-pixel. At the same time, the color cast of the pixel unit caused by the brightness difference of the sub-pixel can be corrected more accurately. Thus, the brightness difference between pixel units can be balanced more precisely, so that display evenness is implemented, and the display effect is improved.

In addition, considering that the display unevenness of the pixel units in the same row or in the same column is different under different colors and different gray levels of the display panel, in other words, under different colors and different gray levels, the brightness difference between the same pixel unit and another pixel unit is different, it may also be considered to set appropriate compensation coefficients for different colors and different gray levels of pixel units. During drive compensation, a matching compensation coefficient is provided for the current color and gray level of the pixel unit, so that different pixel units in the display panel can also receive corresponding drive compensation even if the pixel units in the display panel are in different colors and different gray levels. Thus, the brightness difference between pixel units can be eliminated or weakened, and the display evenness of the display panel is ensured. On this basis, the embodiments of the present disclosure also provide a corresponding embodiment. On the basis of the drive method of the preceding embodiment, step S110 in which the impedance and capacitive reactance variation curve of the first signal line in the column direction is determined, and/or the charge rate variation curve of each first pixel unit in the row direction is determined may include the steps below.

The impedance and capacitive reactance variation curve of the first signal line in the column direction in each color and each gray level display state of the display panel is sequentially determined. Moreover/Alternatively, the charge rate variation curve of each first pixel unit in the row direction in each color and each gray level display state of the display panel is sequentially determined.

In S120, the compensation coefficients for each pixel unit in the column direction and/or the row direction are determined according to the impedance and capacitive reactance variation curve of the first signal line in the column direction and/or the charge rate variation curve of first pixel units in the row direction in the steps below.

The compensation coefficients for each pixel unit in the column direction and/or the row direction in each color and each gray level display state of the display panel are determined according to the impedance and capacitive reactance variation curve of the first signal line in the column direction in each color and each gray level display state of the display panel and/or the charge rate variation curve of first pixel units in the row direction in each color and each gray level display state of the display panel.

In S130, the compensation coefficients for each pixel unit in the column direction and/or the row direction are compensated to the drive signal of the corresponding pixel unit to drive the corresponding pixel unit in the steps below.

The compensation coefficients corresponding to each sub-pixel in the column direction and/or the row direction are compensated to the drive signal of the pixel unit according to the target emitted color and the target gray level of the pixel unit to drive the corresponding pixel unit.

Figure 10:
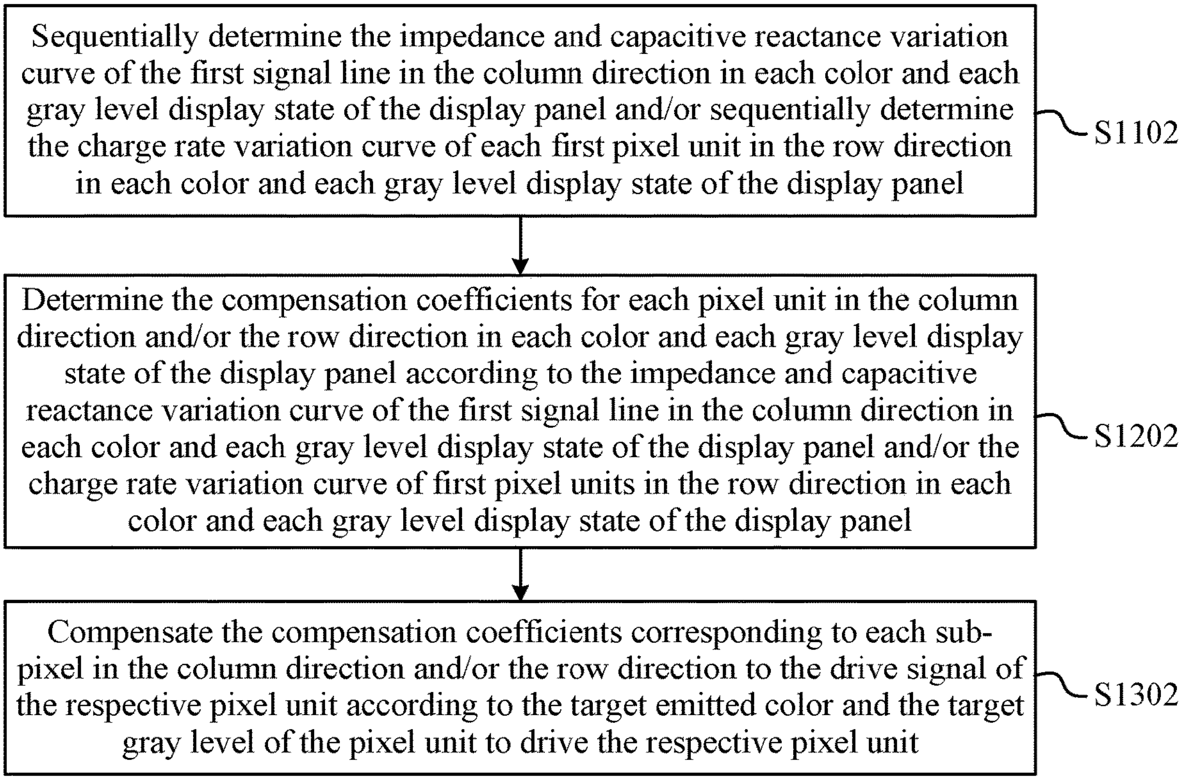
FIG. 10 is a flowchart of another drive compensation method of a display panel according to an embodiment of the present disclosure.

FIG. 10 is a flowchart of another drive compensation method of a display panel according to an embodiment of the present disclosure. Referring to FIG. 10, in another embodiment of the present disclosure, the drive compensation method includes the steps below.

In S1102, the impedance and capacitive reactance variation curve of the first signal line in the column direction in each color and each gray level display state of the display panel is sequentially determined. Moreover/Alternatively, the charge rate variation curve of first pixel units in the row direction in each color and each gray level display state of the display panel is sequentially determined.

In S1202, the compensation coefficients for each pixel unit in the column direction and/or the row direction in each color and each gray level display state of the display panel are determined according to the impedance and capacitive reactance variation curve of the first signal line in the column direction in each color and each gray level display state of the display panel and/or the charge rate variation curve of first pixel units in the row direction in each color and each gray level display state of the display panel.

In S1302, the compensation coefficients corresponding to each sub-pixel in the column direction and/or the row direction are compensated to the drive signal of the pixel unit according to the target emitted color and the target gray level of the pixel unit to drive the corresponding pixel unit.

In this embodiment, corresponding compensation coefficients are set for pixel units of different colors and different gray levels, and corresponding drive compensation is performed under the target emitted color and the target gray level. In this manner, the brightness difference caused by different colors and different gray levels can be balanced in a targeted and effective manner, the brightness adjustment and compensation process of a pixel unit is more accurate. Thus, the brightness difference between pixel units can be balanced more precisely, so that display evenness is implemented, and the display effect is improved.

Figure 11:
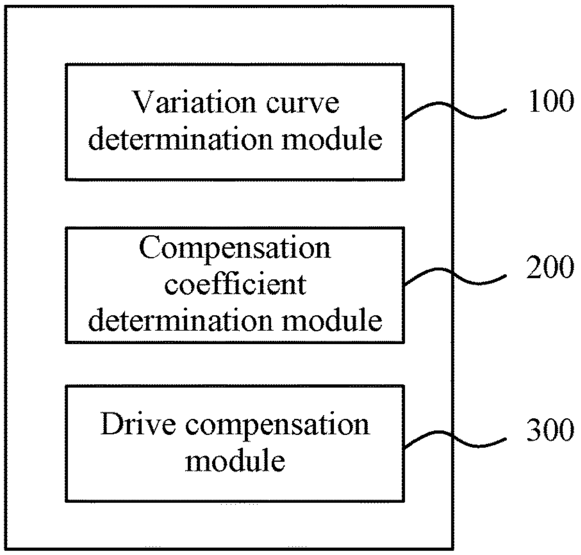
FIG. 11 is a diagram illustrating the structure of a drive compensation system of a display panel according to an embodiment of the present disclosure.

Based on the same concept, an embodiment of the present disclosure provides a drive compensation system of a display panel. FIG. 11 is a diagram illustrating the structure of a drive compensation system of a display panel according to an embodiment of the present disclosure. Referring to FIGS. 1 and 11, first, the drive compensation system of a display panel aims at the display panel as shown in FIG. 1. The display panel includes multiple pixel units 10 sequentially arranged in the row direction 1 and the column direction 2 respectively, and the display panel also includes multiple signal lines 20 extending in the row direction 1 and the column direction 2 respectively. The pixel units 10 include first pixel units 11 sequentially arranged in the row direction 1. The signal lines 20 include first signal lines 21 extending in the column direction 2. On this basis, the drive compensation system includes a variation curve determination module 100, a compensation coefficient determination module 200, and a drive compensation module 300.

The variation curve determination module 100 is configured to determine the impedance and capacitive reactance variation curve of a first signal line in the column direction and/or determine the charge rate variation curve of first pixel units in the row direction.

The compensation coefficient determination module 200 is configured to determine the compensation coefficients for each pixel unit in the column direction and/or the row direction according to the impedance and capacitive reactance variation curve of the first signal line in the column direction and/or the charge rate variation curve of first pixel units in the row direction.

The drive compensation module 300 is configured to compensate the compensation coefficients for each pixel unit in the column direction and/or the row direction to the drive signal of the corresponding pixel unit to drive the corresponding pixel unit.

In the preceding drive compensation system, the variation curve determination module determines the impedance and capacitive reactance variation curve of the first signal line in the column direction and/or determines the charge rate variation curve of first pixel units in the row direction. The compensation coefficient determination module is configured to determine the compensation coefficients for each pixel unit in the column direction and/or the row direction according to the impedance and capacitive reactance variation curve of the first signal line in the column direction and/or the charge rate variation curve of first pixel units in the row direction. Finally, the drive compensation module compensates the compensation coefficients for each pixel unit in the column direction and/or the row direction to the drive signal of the corresponding pixel unit to drive the corresponding pixel unit. In this manner, the compensation drive of the display panel is implemented. In this embodiment of the present disclosure, the display unevenness problem of the display panel caused by the impedance and capacitive reactance of a signal line can be solved, and influencing factors and differences can be analyzed based on the generation principle of display unevenness in the row direction and the column direction. Then the compensation coefficient of each pixel unit is determined. The compensation coefficient is used to compensate the drive signal, so that the brightness difference caused by an impedance and capacitive reactance difference and a charge rate difference is canceled or weakened. Thus, the display panel is enabled to overcome the problem of uneven display.

Further, the variation curve determination module 100 may include an impedance and capacitive reactance determination unit and an impedance and capacitive reactance fitting unit. The impedance and capacitive reactance determination unit is configured to acquire the impedance and capacitive reactance of at least part of first nodes on the first signal line. The impedance and capacitive reactance fitting unit is configured to form the impedance and capacitive reactance variation curve of the first signal line in the column direction by fitting according to the impedance and capacitive reactance of the at least part of the first nodes on the first signal line.

The variation curve determination module 100 may also include a charge rate determination unit and a charge rate fitting unit. The charge rate determination unit is configured to acquire the charge rates of at least part of the first pixel units sequentially arranged in the row direction. The charge rate fitting unit is configured to form the charge rate variation curve of first pixel units in the row direction by fitting according to the charge rates of the at least part of the first pixel units sequentially arranged in the row direction.

Optionally, the impedance and capacitive reactance determination unit is configured to obtain the impedance and capacitive reactance of the at least part of the first nodes on the first signal line through the actual test by using the test display panel or obtain the impedance and capacitive reactance of the at least part of the first nodes on the first signal line through the simulation by using the simulation display panel. Further, the impedance and capacitive reactance determination unit may include an impedance and capacitive reactance actual test subunit and an actual test calculation subunit. The impedance and capacitive reactance actual test subunit is configured to obtain the voltage drops of the at least part of the first nodes on the first signal line and the current on the first signal line through the actual test by using the test display panel. The actual test calculation subunit is configured to calculate the impedance and capacitive reactance of the at least part of the first nodes on the first signal line according to the voltage drops of the at least part of the first nodes on the first signal line, the current on the first signal line, and the voltage drop calculation formula $\Delta V1=I1\times n1\times(R1+C1)$. $\Delta V1$ denotes the voltage drop of a first node on the first signal line. I1 denotes the current on the first signal line. n1 denotes the sequence number of the current first node on the first signal line. R1 denotes the impedance of each pixel unit sequentially arranged in the column direction. C1 denotes the capacitive reactance of each pixel unit sequentially arranged in the column direction.

The impedance and capacitive reactance determination unit may include an impedance and capacitive reactance simulation subunit and a simulation calculation subunit. The impedance and capacitive reactance simulation subunit is configured to obtain the voltage drops of the at least part of the first nodes on the first signal line and the current on the first signal line through the simulation by using the simulation display panel.

The simulation calculation subunit is configured to calculate the impedance and capacitive reactance of the at least part of the first nodes on the first signal line according to the voltage drops of the at least part of the first nodes on the first signal line, the current on the first signal line, and the voltage drop calculation formula $\Delta V1=I1\times n1\times(R1+C1)$. $\Delta V1$ denotes the voltage drop of a first node on the first signal line. I1 denotes the current on the first signal line. n1 denotes the sequence number of the current first node on the first signal line. R1 denotes the impedance of each pixel unit sequentially arranged in the column direction. C1 denotes the capacitive reactance of each pixel unit sequentially arranged in the column direction.

Optionally, the charge rate determination unit may be configured to obtain the charge rates of the at least part of the first pixel units sequentially arranged in the row direction through the actual test by using the test display panel or obtain the charge rates of the at least part of the first pixel units sequentially arranged in the row direction through the simulation by using the simulation display panel.

Further, the charge rate determination unit may include a charge rate actual test subunit and an actual test calculation subunit. The charge rate actual test subunit is configured to obtain the voltage drops of at least part of second nodes on a second signal line and the current on the second signal line through the actual test by using the test display panel. A first pixel unit is electrically connected to the second signal line through a second node. The actual test calculation subunit is configured to calculate the impedance and capacitive reactance of the at least part of the second nodes on the second signal line according to the voltage drops of the at least part of the second nodes on the second signal line, the current on the second signal line, and the voltage drop calculation formula $\Delta V2=I2\times n2\times(R2+C2)$ and replace the charge rate of the first pixel unit electrically connected to the second node with the impedance and capacitive reactance of the second node. $\Delta V2$ denotes the voltage drop of a second node on the second signal line. I2 denotes the current on the second signal line. n2 denotes the sequence number of the current second node on the second signal line. R2 denotes the impedance of each pixel unit sequentially arranged in the row direction. C2 denotes the capacitive reactance of each pixel unit sequentially arranged in the row direction.

The charge rate determination unit may also include a charge rate simulation subunit and a simulation calculation subunit. The charge rate simulation subunit obtains the voltage drops of the at least part of the second nodes on the second signal line and the current on the second signal line through the simulation by using the simulation display panel. A first pixel unit is electrically connected to the second signal line through a second node. The simulation calculation subunit is configured to calculate the impedance and capacitive reactance of the at least part of the second nodes on the second signal line according to the voltage drops of the at least part of the second nodes on the second signal line, the current on the second signal line, and the voltage drop calculation formula $\Delta V2=I2\times n2\times(R2+C2)$ and replace the charge rate of the first pixel unit electrically connected to the second node with the impedance and capacitive reactance of the second node. $\Delta V2$ denotes the voltage drop of a second node on the second signal line. I2 denotes the current on the second signal line. n2 denotes the sequence number of the current second node on the second signal line. R2 denotes the impedance of each pixel unit sequentially arranged in the row direction. C2 denotes the capacitive reactance of each pixel unit sequentially arranged in the row direction. The charge rate determination unit may also include a charge model establishment subunit, a charge subunit, and a charge calculation subunit. The charge model establishment subunit is configured to establish the charge simulation model for the first pixel units sequentially arranged in the row direction. The charge subunit is configured to simulate charging of first pixel units in the same row within a unit time by using the charge simulation model to obtain the voltages of second nodes on the second signal line electrically connected to the at least part of the first pixel units. The charge calculation subunit is configured to calculate the ratio of the voltage of a second node to the target voltage value and use the ratio as the charge rate of the first pixel unit electrically connected to the second node.

Optionally, the drive compensation system also includes a matrix calculation module. The matrix calculation module is configured to calculate the compensation coefficient matrix of each pixel unit in the display panel according to the compensation coefficients for each pixel unit in the column direction and/or the row direction. The drive compensation module 300 is also configured to compensate the compensation coefficients for each pixel unit in the compensation coefficient matrix to the initial data voltage and/or the scan signal of the corresponding pixel unit to obtain the compensation data voltage and/or the compensation scan signal to drive the corresponding pixel unit.

A compensation coefficient in the compensation coefficient matrix is F(x)*G(y). F(x) denotes the compensation coefficient formula of each pixel unit in the column direction. G(y) denotes the compensation coefficient formula of each pixel unit in the row direction. x denotes the row number of the to-be-compensated pixel unit, y denotes the column number of the to-be-compensated pixel unit, $0 \leq x \leq h$, and $0 \leq y \leq w$. h denotes the total number of rows of the pixel units in the display panel. w denotes the total number of columns of the pixel units in the display panel.

The drive compensation module 300 is also configured to multiply the compensation coefficient F(x)*G(y) in the compensation coefficient matrix by the data voltage of the pixel unit in the x-th row and the y-th column to obtain the compensation data voltage to drive the corresponding pixel unit; or multiply the compensation coefficient F(x)*G(y) in the compensation coefficient matrix by the scan signal of the pixel unit in the x-th row and the y-th column to obtain the compensation scan signal so that the pixel unit in the x-th row and the y-th column is driven; or multiply the compensation coefficient F(x) in the compensation coefficient matrix by the data voltage of the pixel unit in the x-th row to obtain the compensation data voltage and multiply the compensation coefficient G(y) in the compensation coefficient matrix by the scan signal of the pixel unit in the y-th column to obtain the compensation scan signal so that the pixel unit in the x-th row and the y-th column is driven. Optionally, the drive compensation module 300 may include a compensation coefficient splitting unit and a sub-compensation coefficient compensation unit. The compensation coefficient splitting unit is configured to split the compensation coefficients for each pixel unit in the column direction and/or the row direction into multiple corresponding sub-compensation coefficients according to the light emission proportioning ratio of multiple sub-pixels in the pixel units. The sub-compensation coefficient compensation unit is configured to correspondingly compensate the multiple sub-compensation coefficients to the drive signals of the sub-pixels to drive the corresponding sub-pixels. Optionally, the variation curve determination module 100 is also configured to determine the impedance and capacitive reactance variation curve of the first signal line in the column direction electrically connected to the multiple sub-pixels of the same color sequentially arranged in the column direction and/or determine the charge rate variation curve in the row direction of each sub-pixel of the same color sequentially arranged in the row direction.

The compensation coefficient determination module 200 is also configured to determine the compensation coefficients for each sub-pixel in the column direction and/or the row direction according to the impedance and capacitive reactance variation curve of the first signal line in the column direction electrically connected to the multiple sub-pixels of the same color sequentially arranged in the column direction and/or the charge rate variation curve in the row direction of each sub-pixel of the same color sequentially arranged in the row direction.

The drive compensation module 300 is also configured to compensate the compensation coefficients for each sub-pixel in the column direction and/or the row direction to the drive signal of the corresponding sub-pixel to drive the corresponding sub-pixel. Optionally, the variation curve determination module 100 is also configured to sequentially determine the impedance and capacitive reactance variation curve of the first signal line in the column direction in each color and each gray level display state of the display panel and/or sequentially determine the charge rate variation curve of first pixel units in the row direction in each color and each gray level display state of the display panel.

The compensation coefficient determination module 200 is also configured to determine the compensation coefficients for each pixel unit in the column direction and/or the row direction in each color and each gray level display state of the display panel according to the impedance and capacitive reactance variation curve of the first signal line in the column direction in each color and each gray level display state of the display panel and/or the charge rate variation curve of first pixel units in the row direction in each color and each gray level display state of the display panel.

The drive compensation module 300 is also configured to compensate the compensation coefficients corresponding to each sub-pixel in the column direction and/or the row direction to the drive signal of the pixel unit according to the target emitted color and the target gray level of the pixel unit to drive the corresponding pixel unit.

Figure 12:
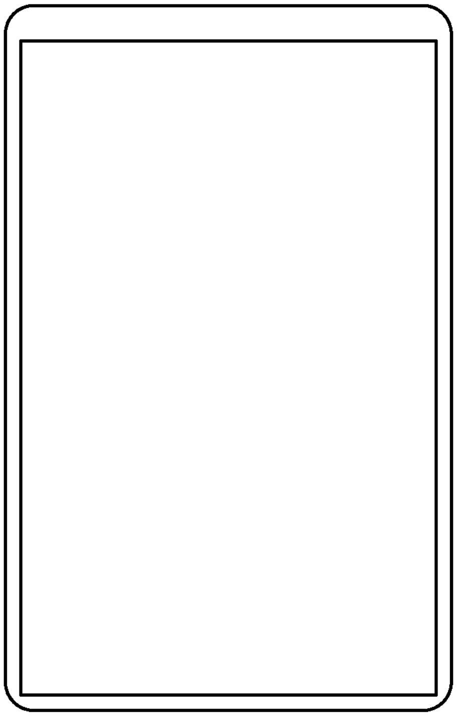
FIG. 12 is a view illustrating the structure of a display device according to an embodiment of the present disclosure.

Based on the same concept, an embodiment of the present disclosure provides a display device. FIG. 12 is a view illustrating the structure of a display device according to an embodiment of the present disclosure. Referring to FIG. 12, the display device applies the drive compensation method of a display panel described in any of the preceding embodiments. Thus, the display device provided by this embodiment of the present disclosure has the corresponding beneficial effects of the drive compensation method provided by the embodiments of the present disclosure, and the details are not repeated here. For example, the display device may be a mobile phone, a computer, a smart wearable device (for example, a smart watch), an onboard display device, and other electronic devices. This is not limited in this embodiment of the present disclosure.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure is described in detail in connection with the preceding embodiments, the present disclosure is not limited to the preceding embodiments and may include equivalent embodiments without departing from the concept of the present disclosure. The scope of the present disclosure is determined by the scope of the appended claims.

What is claimed is:

1. A drive compensation method of a display panel, wherein the display panel comprises:

a plurality of pixel units sequentially arranged in a row direction and a column direction respectively; and a plurality of signal lines extending in the row direction and the column direction respectively;

wherein the plurality of pixel units comprise first pixel units sequentially arranged in the row direction, and the plurality of signal lines comprise first signal lines extending in the column direction; and wherein the drive compensation method comprises:

determining an impedance and capacitive reactance variation curve of one of the first signal lines in the column direction and determining a charge rate variation curve of the first pixel units in the row direction;

determining a compensation coefficient for a respective pixel unit of the plurality of pixel units in at least one of the column direction and the row direction according to the impedance and capacitive reactance variation curve of the one first signal line in at least one of the column direction and the charge rate variation curve of the first pixel units in the row direction; and compensating the compensation coefficient for the respective pixel unit in at least one of the column direction and the row direction to a drive signal of the respective pixel unit to drive the respective pixel unit, wherein determining the impedance and capacitive reactive variation curve of the one first signal line in the column direction comprises:

acquiring impedance and capacitive reactance of at least part of first nodes on the one first signal line, wherein one of the first pixel units is electrically connected to the one first signal line through a respective one first node of the first nodes on the one first signal line;

forming the impedance and capacitive reactance variation curve of the one first signal line in the column direction by fitting according to the impedance and capacitive reactance of the at least part of the first nodes on the one first signal line;

wherein determining the charge rate variation curve of the first pixel unit in the row direction comprises:

acquiring charge rates of at least part of the first pixel units sequentially arranged in the row direction; and forming the charge rate variation curve of the first pixel units in the row direction by fitting according to the charge rates of the at least part of the first pixel units sequentially arranged in the row direction;

or, wherein each pixel unit of the plurality of pixel units comprise a plurality of sub-pixels of different colors; and the determining the impedance and capacitive reactance variation curve of the one first signal line in the column direction comprises:

determining the impedance and capacitive reactance variation curve of the one first signal line in the column direction electrically connected to a plurality of sub-pixels of a same color sequentially arranged in the column direction;

wherein the determining the charge rate variation curve of the first pixel units in the row direction comprises:

determining a charge rate variation curve in the row direction of each of the plurality of sub-pixels of a same color sequentially arranged in the row direction;

wherein determining the compensation coefficients for the respective pixel unit in at least one of the column direction and the row direction according to the impedance and capacitive reactance variation curve of the one first signal line in at least one of the column direction and the change rate variation curve of the first pixel units in the row direction comprises:

determining compensation coefficients for the plurality of sub-pixels in the column direction and/or the row direction according to the impedance and capacitive reactance variation curve of the one first signal line in the column direction electrically connected to the plurality of sub-pixels of the same color sequentially arranged in the column direction and/or the charge rate variation curve in the row direction of the each sub-pixel of the same color sequentially arranged in the row direction; and compensating the compensation coefficient for the respective pixel unit in the column direction and/or the row direction to the drive signal of the respective pixel unit to drive the respective pixel unit comprises:

compensating a compensation coefficients for a respective sub-pixel in the column direction and/or the row direction to a drive signal of the respective sub-pixel to drive the respective sub-pixel;

or, wherein the determining the impedance and capacitive reactance variation curve of the one first signal line in at least one of the column direction and determining the charge rate variation curve of the first pixel units in the row direction comprises:

sequentially determining the impedance and capacitive reactance variation curve of the one first signal line in the column direction in each color and each gray level display state of the display panel and/or sequentially determining the charge rate variation curve of the first pixel units in the row direction in the each color and each gray level display state of the display panel, wherein the determining the compensation coefficient for the respective pixel unit in at least one of the column direction and the row direction according to the impedance and capacitive reactance variation curve of the one first signal line in the column direction and/or the charge rate variation curve of the first pixel units in the row direction comprises:

determining compensation coefficients for the each pixel unit in the column direction and/or the row direction in the each color and each gray level display state of the display panel according to the impedance and capacitive reactance variation curve of the one first signal line in the column direction in the each color and each gray level display state of the display panel and/or the charge rate variation curve of the first pixel units in the row direction in the each color and each gray level display state of the display panel; and wherein the compensating the compensation coefficients for the respective pixel unit in at least one of the column direction and the row direction to the drive signal of the respective pixel unit to drive the respective pixel unit comprises:

compensating the compensation coefficients corresponding to the each sub-pixel in the column direction and/or the row direction to the drive signal of the respective pixel unit according to a target emitted color and a target gray level of the pixel unit to drive the respective pixel unit.

2. The drive compensation method according to claim 1, wherein the acquiring the impedance and capacitive reactance of the at least part of the first nodes on the one first signal line comprises:

obtaining the impedance and capacitive reactance of the at least part of the first nodes on the one first signal line through an actual test by using a test display panel or obtaining the impedance and capacitive reactance of the at least part of the first nodes on the one first signal line through a simulation by using a simulation display panel.

3. The drive compensation method according to claim 2, wherein obtaining the impedance and capacitive reactance of the at least part of the first nodes on the one first signal line through the actual test by using the test display panel comprises:

obtaining voltage drops of the at least part of the first nodes on the one first signal line and a current on the one first signal line through the actual test by using the test display panel; and calculating the impedance and capacitive reactance of the at least part of the first nodes on the one first signal line according to the voltage drops of the at least part of the first nodes on the one first signal line, the current on the one first signal line, and a voltage drop calculation formula $\Delta V1=I1\times n1\times(R1+C1)$; and wherein the obtaining the impedance and capacitive reactance of the at least part of the first nodes on the one first signal line through the simulation by using the simulation display panel comprises:

obtaining the voltage drops of the at least part of the first nodes on the one first signal line and the current on the one first signal line through the simulation by using the simulation display panel; and calculating the impedance and capacitive reactance of the at least part of the first nodes on the one first signal line according to the voltage drops of the at least part of the first nodes on the one first signal line, the current on the one first signal line, and the voltage drop calculation formula $\Delta V1=I1\times n1\times(R1+C1)$, wherein $\Delta V1$ denotes a voltage drop of one of the first nodes on the one first signal line, I1 denotes the current on the one first signal line, n1 denotes a sequence number of the current first node on the one first signal line, R1 denotes impedance of each of the plurality of pixel units sequentially arranged in the column direction, and C1 denotes capacitive reactance of each pixel unit sequentially arranged in the column direction.

4. The drive compensation method according to claim 1, wherein the acquiring the charge rates of the at least part of the first pixel units sequentially arranged in the row direction comprises:

obtaining the charge rates of the at least part of the first pixel units sequentially arranged in the row direction through an actual test by using a test display panel or obtaining the charge rates of the at least part of the first pixel units sequentially arranged in the row direction through a simulation by using a simulation display panel.

5. The drive compensation method according to claim 4, wherein the plurality of signal lines further comprise second signal lines extending in the row direction;

obtaining the charge rates of the at least part of the first pixel units sequentially arranged in the row direction through the actual test by using the test display panel comprises:

obtaining voltage drops of at least part of second nodes on one of the second signal lines and a current on the one second signal line through the actual test by using the test display panel, wherein one of the first pixel units is electrically connected to the one second signal line through a respective one second node of the second nodes; and calculating impedance and capacitive reactance of the at least part of the second nodes on the one second signal line according to the voltage drops of the at least part of the second nodes on the one second signal line, the current on the one second signal line, and a voltage drop calculation formula $\Delta V2=I2\times n2\times(R2+C2)$ and replacing a charge rate of the one first pixel unit electrically connected to the one second node with impedance and capacitive reactance of the one second node; and wherein obtaining the charge rates of the at least part of the first pixel units sequentially arranged in the row direction through the simulation by using the simulation display panel comprises:

obtaining the voltage drops of the at least part of the second nodes on the one second signal line and the current on the one second signal line through the simulation by using the simulation display panel, wherein the one first pixel unit is electrically connected to the one second signal line through the respective one second node; and calculating the impedance and capacitive reactance of the at least part of the second nodes on the one second signal line according to the voltage drops of the at least part of the second nodes on the one second signal line, the current on the one second signal line, and the voltage drop calculation formula $\Delta V2=I2\times n2\times(R2+C2)$ and replacing the charge rate of the one first pixel unit electrically connected to the one second node with the impedance and capacitive reactance of the one second node, wherein $\Delta V2$ denotes a voltage drop of one of the second nodes on the one second signal line, I2 denotes the current on the one second signal line, n2 denotes a sequence number of the current second node on the one second signal line, R2 denotes impedance of each of the plurality of pixel units sequentially arranged in the row direction, and C2 denotes capacitive reactance of each pixel unit sequentially arranged in the row direction.

6. The drive compensation method according to claim 4, wherein the plurality of signal lines further comprise second signal lines extending in the row direction;

wherein the obtaining the charge rates of the at least part of the first pixel units sequentially arranged in the row direction through the simulation by using the simulation display panel comprises:

establishing a charge simulation model for the first pixel units sequentially arranged in the row direction;

simulating charging of first pixel units in a same row within a unit time by using the charge simulation model to obtain voltages of second nodes on one of the second signal lines electrically connected to the at least part of the first pixel units; and calculating a ratio of a voltage of one of the second nodes to a target voltage value and using the ratio as a charge rate of a first pixel unit electrically connected to the one second node.

7. The drive compensation method according to claim 1, wherein after determining the compensation a coefficient for the respective pixel unit in at least one of the column direction and the row direction according to the impedance and capacitive reactance variation curve of the one first signal line in at least one of the column direction and the charge rate variation curve of the first pixel units in the row direction, the method further comprises:

calculating a compensation coefficient matrix of the pixel units in the display panel according to the compensation coefficient for the respective pixel unit in at least one of the column direction and the row direction; and wherein the compensating the compensation coefficient for the respective pixel unit in at least one of the column direction and the row direction to the drive signal of the respective pixel unit to drive the respective pixel unit comprises:

compensating compensation coefficient for the respective pixel unit in the compensation coefficient matrix to an initial data voltage and/or a scan signal of the respective pixel unit to obtain a compensation data voltage and/or a compensation scan signal to drive the respective pixel unit.

8. The drive compensation method according to claim 7, wherein a compensation coefficient in the compensation coefficient matrix is F(x)*G(y), wherein F(x) denotes a compensation coefficient formula of each pixel unit of the plurality of pixel units in the column direction, and G(y) denotes a compensation coefficient formula of each pixel unit of the plurality of pixel units in the row direction, wherein x denotes a row number of a to-be-compensated pixel unit, y denotes a column number of the to-be-compensated pixel unit, $0 \le x \le h$, and $0 \le y \le w$, wherein h denotes a total number of rows of the plurality of pixel units in the display panel, and w denotes a total number of columns of the plurality of pixel units in the display panel;

compensating the compensation coefficients for the respective pixel unit in the compensation coefficient matrix to the initial data voltage and/or the scan signal of the respective pixel unit to obtain the compensation data voltage and/or the compensation scan signal to drive the respective pixel unit comprises:

multiplying the compensation coefficient F(x)*G(y) in the compensation coefficient matrix by a data voltage of a pixel unit in an x-th row and a y-th column to obtain a compensation data voltage to drive the corresponding pixel unit; or multiplying the compensation coefficient F(x)*G(y) in the compensation coefficient matrix by a scan signal of the pixel unit in the x-th row and the y-th column to obtain a compensation scan signal to drive the pixel unit in the x-th row and the y-th column; or multiplying a compensation coefficient F(x) in the compensation coefficient matrix by a data voltage of a pixel unit in the x-th row to obtain a compensation data voltage and multiplying a compensation coefficient G(y) in the compensation coefficient matrix by a scan signal of a pixel unit in the y-th column to obtain a compensation scan signal so that the pixel unit in the x-th row and the y-th column is driven.

9. The drive compensation method according to claim 1, wherein each pixel unit of the plurality of pixel units comprises a plurality of sub-pixels of different colors;

compensating the compensation coefficients for the respective pixel unit in at least one of the column direction and the row direction to the drive signal of the respective pixel unit to drive the respective pixel unit comprises:

splitting the compensation coefficient for the respective pixel unit in the column direction and/or the row direction into a plurality of sub-compensation coefficients according to a light emission proportioning ratio of the plurality of sub-pixels in the respective pixel unit; and compensating the plurality of sub-compensation coefficients to drive signals of the plurality of sub-pixels to drive the plurality of corresponding sub-pixels.

10. The drive compensation method according to claim 1, wherein in the at least part of the first nodes, spacing between each of the at least part of the first nodes maintains equal; and in the at least part of the first pixel units, spacing between each of the at least part of the first pixel units maintains equal.

11. The drive compensation method according to claim 1, wherein a number of the at least part of the first nodes is greater than or equal to one tenth of a total number of rows of the display panel, and/or a number of the at least part of the first pixel units is greater than or equal to one tenth of a total number of columns of the display panel.

12. A drive compensation system of a display panel, wherein the display panel comprises:

a plurality of pixel units sequentially arranged in a row direction and a column direction respectively; and a plurality of signal lines extending in the row direction and the column direction respectively;

wherein the plurality of pixel units comprise first pixel units sequentially arranged in the row direction, and the plurality of signal lines comprise first signal lines extending in the column direction; and wherein the drive compensation system comprises:

a variation curve determination module configured to determine an impedance and capacitive reactance variation curve of one of the first signal lines in the column direction and a charge rate variation curve of the first pixel units in the row direction;

a compensation coefficient determination module configured to determine a compensation coefficients for a respective pixel unit of the plurality of pixel units in the column direction and/or the row direction according to the impedance and capacitive reactance variation curve of the one first signal line in the column direction and/or the charge rate variation curve of the first pixel units in the row direction; and a drive compensation module configured to compensate the compensation coefficient for the respective pixel unit in the column direction and/or the row direction to a drive signal of the respective pixel unit to drive the respective pixel unit;

the variation curve determination module further comprises an impedance and capacitive reactance determination unit and an impedance and capacitive reactance fitting unit;

the impedance and capacitive reactance determination unit is configured to acquire the impedance and capacitive reactance of at least part of first nodes on the first signal line; wherein one of the first pixel units is electrically connected to the one first signal line through a respective one first node of the first nodes on the one first signal line;

the impedance and capacitive reactance fitting unit is configured to form the impedance and capacitive reactance variation curve of the first signal line in the column direction by fitting according to the impedance and capacitive reactance of the at least part of the first nodes on the tint signal line;

the variation curve determination module further comprises a charge rate determination unlit and a charge rate fitting unit, the charge rate determination unit is configured to acquire the charge rates of at least part of the first pixel units sequentially arranged in the row direction; and the charge rate fitting unit is configured to form the charge rate variation curve of first pixel units in the row direction by fitting according to the charge rates of the at least part of the first pixel units sequentially arranged in the row direction;

or, wherein each pixel unit of the plurality of pixel units comprise a plurality of sub-pixels of different colors; and the variation curve determination module is further configured to determine the impedance and capacitive reactance variation curve of the one first signal line in the column direction electrically connected to a plurality of sub-pixels of a same color sequentially arranged in the column direction, and determine a charge rate variation curve in the row direction of each of the plurality of sub-pixels of a same color sequentially arranged in the row direction, the compensation coefficient determination module is further configured to determine compensation coefficients for the plurality of subpixels in the column direction and/or the row direction according to the impedance and capacitive reactance variation curve of the one first signal line in the column direction electrically connected to the plurality of sub-pixels of the same color sequentially arranged in the column direction and/or the charge rate variation curve in the row direction of the each sub-pixel of the same color sequentially arranged in the row direction;

the drive compensation module configured to is further configured to compensate a compensation coefficients for a respective sub-pixel in the column direction and/or the row direction to a drive signal of the respective sub-pixel to drive the respective sub-pixel;

or, the variation curve determination module is further configured to sequentially determine the impedance and capacitive reactance variation curve of the one first signal line in the column direction in each color and each gray level display state of the display panel and/or sequentially determining the charge rate variation curve of the first pixel units in the row direction in the each color and each gray level display state of the display panel;

the compensation coefficient determination module is further configured to determine compensation coefficients for the each pixel unit in the column direction and/or the row direction in the each color and each gray level display state of the display panel according to the impedance and capacitive reactance variation curve of the one first signal line in the column direction in the each color and each gray level display state of the display panel and/or the charge rate variation curve of the first pixel units in the row direction in the each color and each gray level display state of the display panel; and the drive compensation module is further configured to compensate the compensation coefficients corresponding to the each sub-pixel in the column direction and/or the row direction to the drive signal of the respective pixel unit according to a target emitted color and a target gray level of the pixel unit to drive the respective pixel unit.

13. A display device, applying a drive compensation method of a display panel, wherein the display panel comprises:

a plurality of pixel units sequentially arranged in a row direction and a column direction respectively; and a plurality of signal lines extending in the row direction and the column direction respectively;

wherein the plurality of pixel units comprise first pixel units sequentially arranged in the row direction, and the plurality of signal lines comprise first signal lines extending in the column direction; and wherein the drive compensation method comprises:

determining an impedance and capacitive reactance variation curve of one of the first signal lines in the column direction and determining a charge rate variation curve of the first pixel units in the row direction;

determining a compensation coefficient for a respective pixel unit of the plurality of pixel units in at least one of the column direction and the row direction according to the impedance and capacitive reactance variation curve of the one first signal line in at least one of the column direction and the charge rate variation curve of the first pixel units in the row direction; and compensating the compensation coefficient for the respective pixel unit in at least one of the column direction and the row direction to a drive signal of the respective pixel unit to drive the respective pixel unit, wherein determining the impedance and capacitive reactance variation curve of the one first signal line in the column direction comprises, acquiring impedance and capacitive reactance of at least part of first nodes on the one first signal line, wherein one of the first pixel units is electrically connected to the one first signal line through a respective one first node of the first nodes on the one first signal line;

forming the impedance and capacitive reactance variation curve of the one first signal line in the column direction by fitting according to the impedance and capacitive reactance of the at least part of the first nodes on the one first signal line;

wherein determining the charge rate variation curve of the first pixel units in the row direction comprises:

acquiring charge rates of at least part of the first pixel units sequentially arranged in the row direction; and forming the charge rate variation curve of the first pixel units in the row direction by fitting according to the charge rates of the at least part of the first pixel units sequentially arranged in the row direction;

or, wherein each pixel unit of the plurality of pixel units comprise a plurality of sub-pixels of different colors, and the determining the impedance and capacitive reactance variation curve of the one first signal line in the column direction comprises:

determining the impedance and capacitive reactance variation curve of the one first signal line in the column direction electrically connected to a plurality of sub-pixels of a same color sequentially arranged in the column direction;

wherein the determining the charge rate variation curve of the first pixel units in the row direction comprises:

determining a charge rate variation curve in the row direction of each of the plurality of sub-pixels of a same color sequentially arranged in the row direction;

wherein determining the compensation coefficients for the respective pixel unit in at least one of the column direction and the row direction according to the impedance and capacitive reactance variation curve of the one first signal line in at least one of the column direction and the charge rate variation curve of the first pixel units in the row direction comprises:

determining compensation coefficients for the plurality of sub-pixels in the column direction and/or the row direction according to the impedance and capacitive reactance variation curve of the one first signal line in the column direction electrically connected to the plurality of sub-pixels of the same color sequentially arranged in the column direction and/or the charge rate variation curve in the row direction of the each sub-pixel of the same color sequentially arranged in the row direction; and compensating the compensation coefficient for the respective pixel unit in the column direction and/or the row direction to the drive signal of the respective pixel unit to drive the respective pixel unit comprises:

compensating a compensation coefficients for a respective sub-pixel in the column direction and/or the row direction to a drive signal of the respective sub-pixel to drive the respective sub-pixel;

or, wherein the determining the impedance and capacitive reactance variation curve of the one first signal line in at least one of the column direction and determining the charge rate variation curve of the first pixel units in the row direction comprises;

sequentially determining the impedance and capacitive reactance variation curve of the one first signal line in the column direction in each color and each gray level display state of the display panel and/or sequentially determining the charge rate variation curve of the first pixel units in the row direction in the each color and each gray level display state of the display panel, wherein the determining the compensation coefficient for the respective pixel unit in at least one of the column direction and the row direction according to the impedance and capacitive reactance variation curve of the one first signal line in the column direction and/or the charge rate variation curve of the first pixel units in the row direction comprises:

determining compensation coefficients for the each pixel unit in the column direction and/or the row direction in the each color and each gray level display state of the display panel according to the impedance and capacitive reactance variation curve of the one first signal line in the column direction in the each color and each gray level display state of the display panel and/or the charge rate variation curve of the first pixel units in the row direction in the each color and each gray level display state of the display panel; and wherein the compensating the compensation coefficients for the respective pixel unit in at least one of the column direction and the row direction to the drive signal of the respective pixel unit to drive the respective pixel unit comprises:

compensating the compensation coefficients corresponding to the each sub-pixel in the column direction and/or the row direction to the drive signal of the respective pixel unit according to a target emitted color and a target gray level of the pixel unit to drive the respective pixel unit.

* * * * *